(12) United States Patent
Presley

(10) Patent No.: US 6,569,058 B2
(45) Date of Patent: May 27, 2003

(54) LINEAR MOTION SHIFTER

(75) Inventor: William T Presley, Macomb Township, MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 5 days.

(21) Appl. No.: 10/026,251

(22) Filed: Dec. 20, 2001

(65) Prior Publication Data

US 2002/0077217 A1 Jun. 20, 2002

Related U.S. Application Data

(60) Provisional application No. 60/257,015, filed on Dec. 20, 2000.

(51) Int. Cl.$^7$ .................. B60K 41/20; B60K 41/26; B60K 20/00; B60K 6/00; G05G 9/00
(52) U.S. Cl. .................. 477/96; 74/473.19; 74/473.2
(58) Field of Search .................. 477/96; 74/473.19, 74/473.2, 473.12, 473.15, 473.13, 473.14, 473.24

(56) References Cited

U.S. PATENT DOCUMENTS

| 2,772,652 | A | * | 12/1956 | Shane et al. | ................ 74/337.5 |
| 3,902,378 | A | * | 9/1975 | Osborn | .................... 74/473.19 |
| 4,546,664 | A | * | 10/1985 | Mylander | ................ 74/473.19 |
| 5,125,326 | A | * | 6/1992 | Sarcona | .......................... 92/62 |
| 5,870,929 | A | * | 2/1999 | Bravo | ...................... 74/473.18 |
| 6,000,296 | A | * | 12/1999 | Sundquist | ................ 74/473.12 |
| 6,047,609 | A | * | 4/2000 | Brower et al. | ........... 74/473.19 |

* cited by examiner

Primary Examiner—Sherry Estremsky
Assistant Examiner—Tisha D. Lewis
(74) Attorney, Agent, or Firm—Ralph E. Smith

(57) ABSTRACT

A linearly moveable gear selector system is provided for controlling operation of a vehicle drivetrain component. The gear selector system is coupled to a transmission and/or transfer case unit and is configured to shift the drivetrain component into a desired mode of operation. The gear selector system includes a selector lever that is movable by an operator in a linear direction parallel to a lengthwise axis of the vehicle. The selector system includes a slidable guide shaft that produces a linear motion linked to the drivetrain component that is proportion in magnitude and direction as that of selector lever.

13 Claims, 2 Drawing Sheets

LINEAR MOTION SHIFTER

CROSS-REFERENCE TO RELATED APPLICATIONS

This application claims the benefit of U.S. Provisional Patent Application Ser. No. 60/257,015 filed on Dec. 20, 2000.

BACKGROUND OF THE INVENTION

1. Technical Field

The present invention relates generally to vehicle gear selector systems, and more particularly to a vehicle gear selector system having a selector lever that is moved in a linear manner to select a gear ratio.

2. Background Art

Vehicles with multi-speed gear ratio transmissions frequently employ a gear selector system having a pivoting selector lever operatively connected to the transmission and moved by a driver to select a desired operational mode of the transmission. Gear selector systems having a pivoting selector lever are also frequently employed in four-wheel drive vehicles to control the operational mode of a transfer case. Despite the relatively common use of such selector systems, several drawbacks have been noted with the pivoting selector lever arrangement.

One such drawback concerns the relative complexity of such systems. One specific area of complexity relates to the manner in which the selector lever is locked to inhibit the shifting of the transmission in an undesired manner (e.g., directly from a forward mode of operation to a reverse mode of operation). Another area of complexity relates to the need to for such systems to convert the rotary motion of the selector lever to a linear linkage motion necessary to effect the desired setting of the transmission.

Therefore, a need exists for a gear selector system having less complexity.

SUMMARY OF THE INVENTION

In accordance with one aspect of the present invention, a gear selector system for a vehicle drivetrain component is provided having a selector lever that is movable by an operator in a linear direction parallel to a lengthwise axis of the vehicle, and a guide shaft connected to the selector level and slidably supported on the vehicle. A coupler is connected to the guide shaft and a control linkage coupled to the drivetrain component. The coupler is arranged to move the control linkage in proportion and direction to movement of the guide shaft in response to movement of the selector lever, thereby control operation of the drivetrain component.

In accordance with another aspect of the present invention, a gear selector system for a vehicle drivetrain component is provided having a first and second selector lever arranged to be movable by an operator in a linear direction parallel to each other and a lengthwise axis of the vehicle, and a guide shaft connected to each selector level and slidably supported on the vehicle. A coupler is connected to each guide shaft and a respective one of a control linkage coupled to a transmission unit and transfer case unit. Each coupler is arranged to move the respective control linkage in proportion and direction to movement of the guide shaft in response to movement of the selector lever connected thereto.

These and other aspects, features, and advantages of the present invention will be readily apparent from the following detailed description of the preferred embodiment(s) when taken in connection with the accompanying drawings.

DETAILED DESCRIPTION OF THE PREFERRED EMBODIMENT(S)

Figure 1:
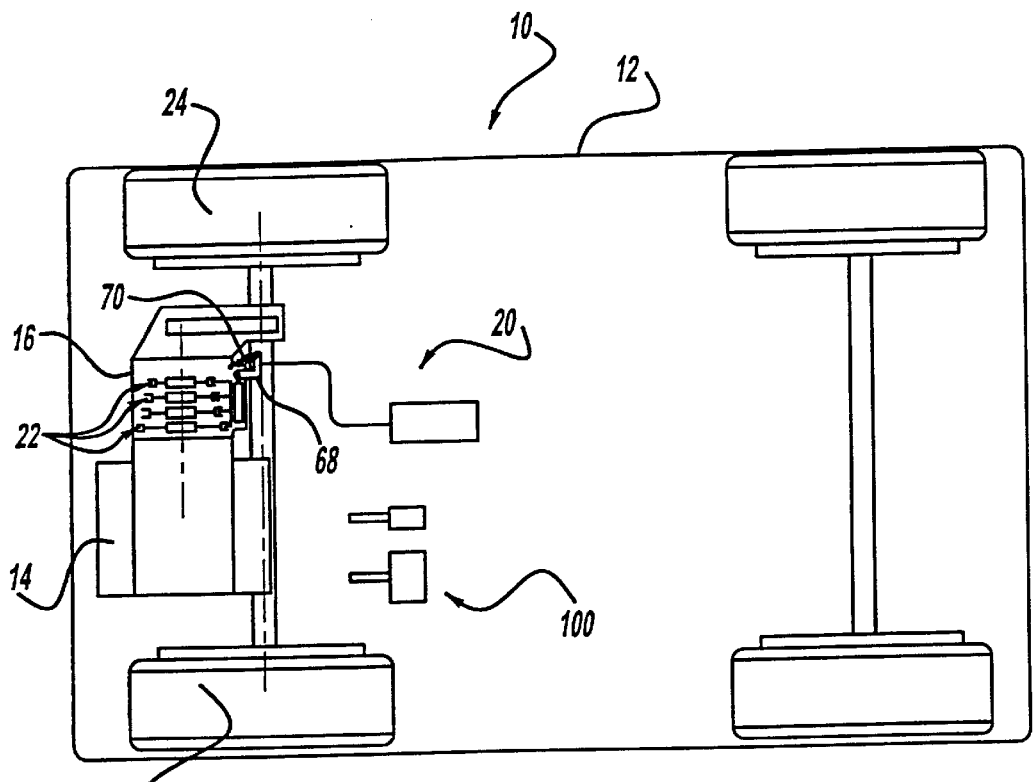
FIG. 1 is a schematic illustration of a vehicle constructed in accordance with the teachings of the present invention.

With reference to FIG. 1 of the drawings, a vehicle constructed in accordance with the teachings of the present invention is generally indicated by reference numeral 10. Vehicle 10 is schematically shown to include a vehicle body 12, a power source 14, a drivetrain component such as a transmission unit 16 and a gear selector system 20. Power source 14, such as an internal combustion engine, is conventionally arranged to provide a rotational power input to transmission 16. Transmission 16 is also conventional in that it includes a plurality of gears that may be selectively meshed into engagement to provide a predetermined set of gear ratios 22 for transmitting rotational power from the power source 14 to the vehicle drive wheels 24 (denoted as the front wheels for illustrative purposes only). The gear selector system 20 is coupled to the transmission 16 and is operable for transmitting a gear selector input from the vehicle operator to the transmission 16 to cause the transmission 16 to be operated in a desired gear ratio 22/mode of operation.

Figure 2:
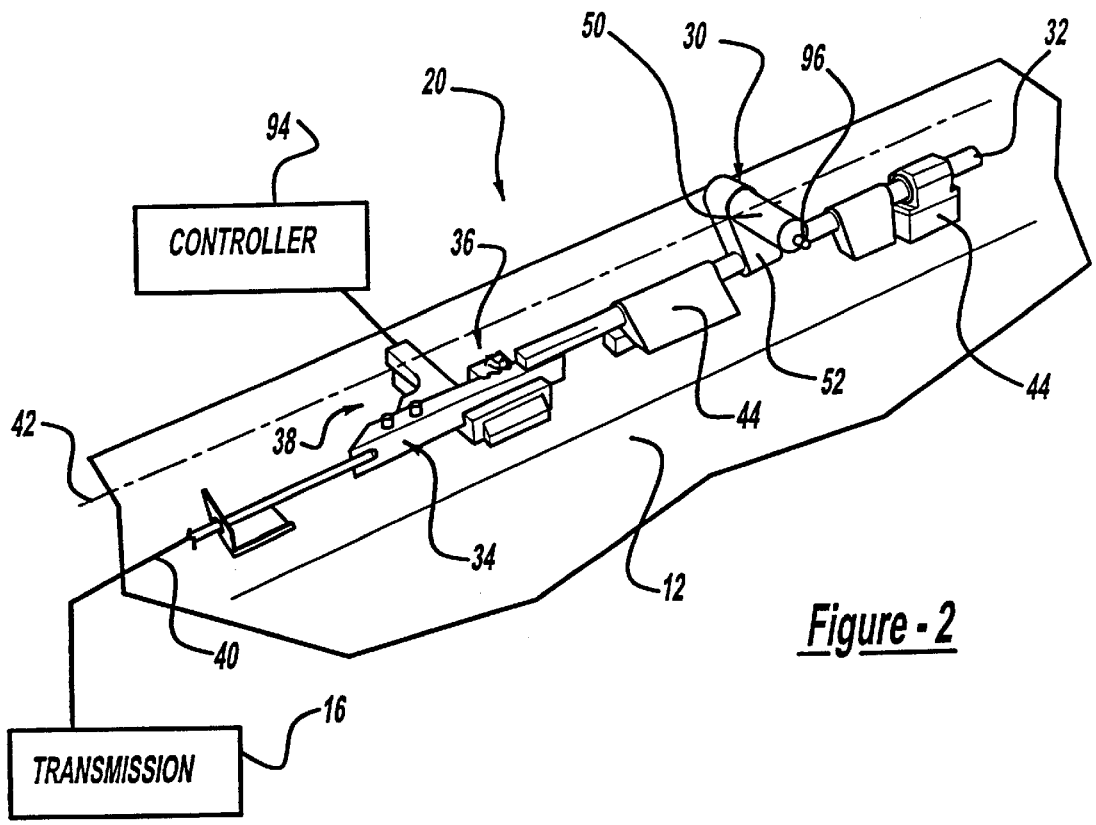
FIG. 2 is a perspective view of a portion of the vehicle of FIG. 1 illustrating the gear selector mechanism in greater detail.

As shown in FIG. 2, the gear selector system 20 includes a selector lever 30, a guide shaft 32, a coupling assembly 34, a detent mechanism 36, a lock-out mechanism 38 and a connecting cable 40. In the particular embodiment illustrated, the guide shaft 32 is oriented parallel to a longitudinal axis 42 of the vehicle 10, i.e., lengthwise of the vehicle, and is supported by a pair of linear bearings 44 coupled to the vehicle body 12 that allow the guide shaft to slide therein. The guide shaft 32 is illustrated to be of a solid cylindrical shape but those skilled in the art will understand that the guide shaft may be formed differently, using tubular materials or extruded shapes for example. The selector lever 30 is comfortably contoured and fixedly coupled to the guide shaft 32. In the example provided, the selector lever 30 is generally L-shaped, having a handle portion 50 that extends generally perpendicular to the guide shaft 32 and an offsetting portion 52 that elevates the handle portion 50 off the guide shaft 32.

The coupling assembly 34 is fixedly coupled to the guide shaft 32 such that movement of the guide shaft 32 causes the coupling assembly 34 to move proportionally in the same direction. With additional reference to FIG. 3, the coupling assembly 34 includes a coupling bar 60 into which a plurality of detents 62 and a plurality of pin apertures 64 are formed. A cable connector 66 is fixedly coupled to the forward end of the coupling bar 60. A first end of the connecting cable 40 is coupled to the cable connector 66 and an opposite end of the connecting cable 40 is coupled to a spring-biased lever 68 (FIG. 1) that controls the operation of the transmission 16 as is well understood in the art.

In operation, a spring 70 (FIG. 1) biases the lever 68 in a forward direction that is associated with the operation of the transmission in a first one of the gear ratios 22 or modes of operation. Rearward movement of the coupling bar 60 causes similar rearward movement of the connecting cable, placing the lever 68 in another position associated with another one of the gear ratios 22 or modes of operation. Forward movement of the coupling bar 60 releases some of the tension applied to the connecting cable 40, permitting spring 70 to return the lever 68 to the position associated with the first one of the gear ratios 22.

From the foregoing, those skilled in the art will understand that the selector lever 30 is movable by the vehicle operator in an axial direction parallel to the longitudinal axis 42 of the vehicle 10. In response thereto, the gear selector system 20 produces a linear output for shifting the transmission 16, with the linear output being proportional to, i.e., the same magnitude and direction, movement of the selector lever 30.

Figure 3:
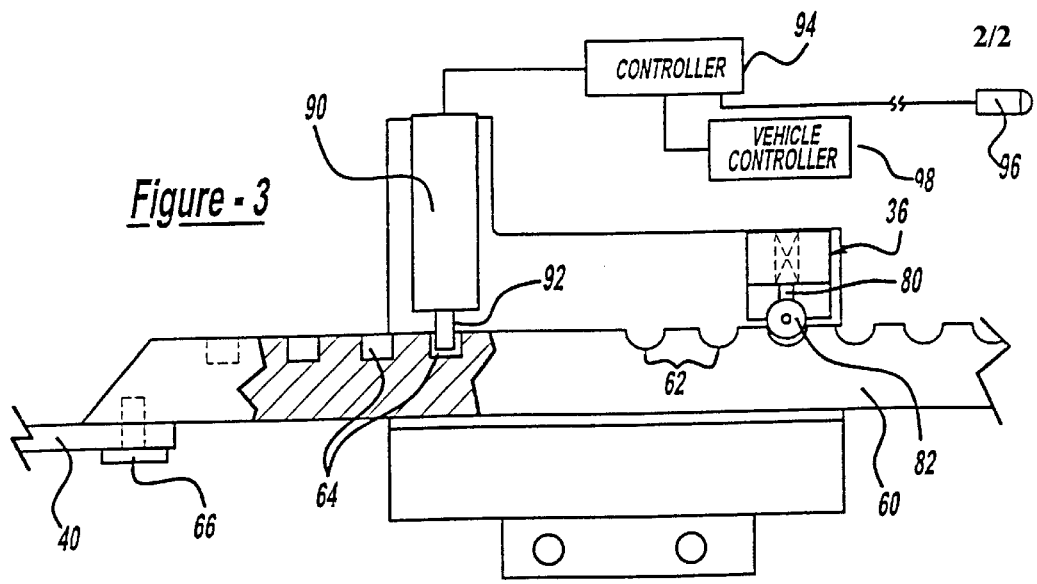
FIG. 3 is a top view of a portion of the vehicle of FIG. 1 illustrating the gear selector mechanism in greater detail.
Figure 4:
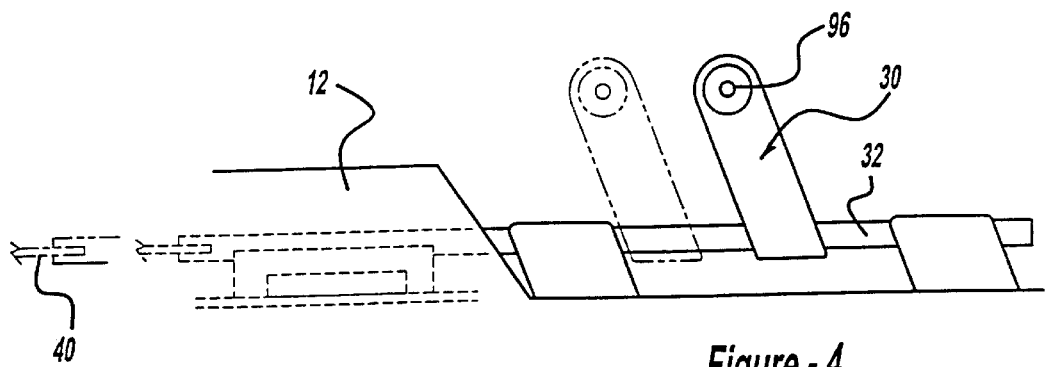
FIG. 4 is a side elevation of a portion of the vehicle of FIG. 1.

As best seen in FIG. 3, a stationary detent mechanism 36 includes a translating, spring-biased arm 80 and a roller 82 that is rotatably coupled to the distal end of the arm 80. The arm 80 and roller 82 are configured to cooperate with the plurality of detents 62 formed in coupling bar 60 to permit the coupling bar (and therefore, the selector lever 30) to be positioned in one of several predetermined positions corresponding to "park," "reverse," "neutral," "drive," "second gear," and "low gear" gear ratios. Accordingly, detents 62 are positioned along the coupling bar 60 at predetermined points that correspond to the positioning of the lever 68 at corresponding operational positions. The spring-biased arm 80 is operable for urging the roller 82 to roll against the side of the coupling bar 60. Movement of the selector lever 30 a sufficient distance in a linear direction permits the roller 82 to align with one of the detents 62. Alignment between the roller 82 and a detent 62 provides the vehicle operator with tactile feedback as to the position of the selector lever 30 as well as applies a force to the coupling bar 60 which tends to prevent the coupling bar 60 (and selector lever 30) from moving.

The lock-out mechanism 38 includes an electronically-actuated solenoid 90, a lock-out pin 92, a controller 82 and a shift lever release switch 96. The lock-out pin 92 is coupled to an output member of the solenoid 90. The solenoid 90 is fixedly coupled to the vehicle body 12 such that the lock-out pin 92 is perpendicular to the coupling bar 60. The solenoid 90 is operable in a first condition to retract the lock-out pin 92 relative to the coupling bar 60 and a second condition to extend the lock-out pin 92 toward the coupling bar 60. The solenoid 90 preferably has a configuration wherein it is normally maintained in the second condition. Positioning of the lock-out pin 92 in the extended position such that it engages one of the pin apertures 64 inhibits the axial movement of the coupling bar 60 and shift lever 68.

The controller 82 is coupled to the solenoid 90, a vehicle controller 98, and shift lever release switch 96. The shift lever release switch 96 is operable for generating a control signal indicating that operation of the selector lever is desired. In the particular embodiment illustrated, the shift lever release switch 96 is coupled to the selector lever 30 so as to be conveniently located for the vehicle operator. Those skilled in the art will understand, however, that the shift lever release switch 96 may be located remotely from the selector lever 30.

The controller 82 is operable for generating a pin retract signal for shifting the solenoid 90 from the second condition to the first condition. The pin retract signal is generated in response to a predetermined schedule of signals including the control signal from switch 98, a control signal indicative of the currently engaged gear ratio 22/mode of operation of transmission 16, a signal indicative of whether the vehicle 10 is running, and/or a signal indicative of whether a vehicle brake pedal 100 (FIG. 1) is presently engaged. If, for example, the lock-out pin 92 is extended into a pin aperture 64 that corresponds with the placement of the shift lever 68 in a "park" position, the pin retract signal is generated in response to the vehicle operating signal, the brake pedal depressed signal and the switch desired signal. In this example, if one or more of the vehicle operating signal, the brake pedal depressed signal and the switch desired signal is not present, the pin retract signal is not generated to retract the lock-out pin 92 from the coupling bar 60 and as such, the shift lever 68 cannot be moved from its present position.

Figure 5:
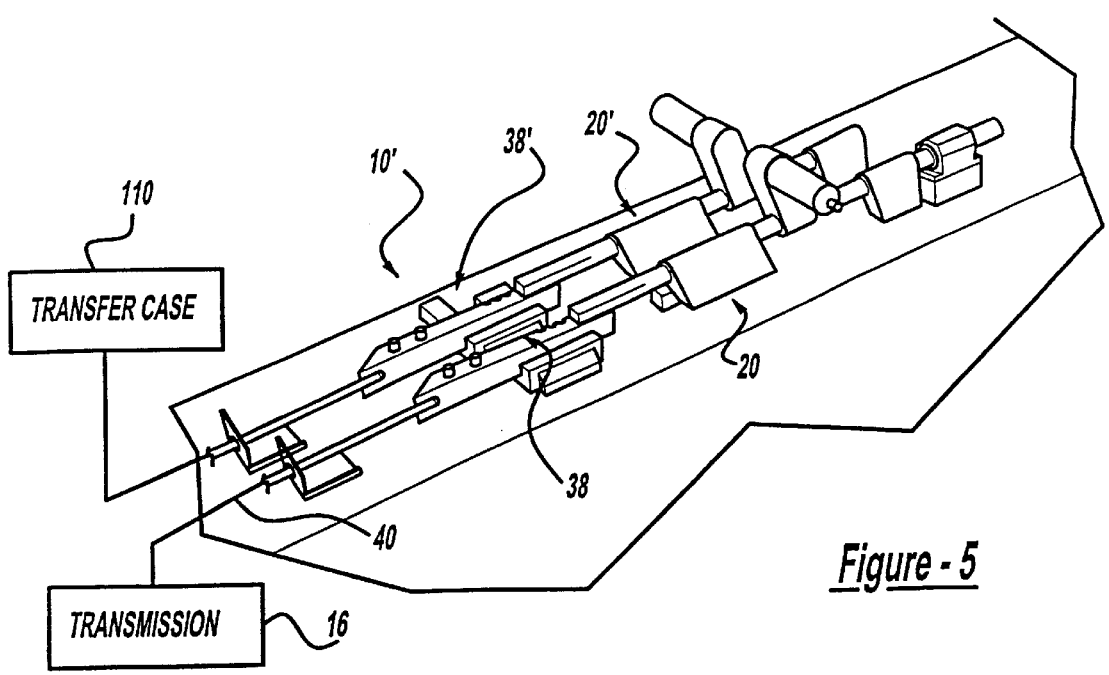
FIG. 5 is a perspective view of a portion of a vehicle constructed in accordance with the teachings of an alternate embodiment of the present invention.

A vehicle constructed in accordance with the teachings of a second embodiment of the present invention is illustrated in FIG. 5 and generally indicated by reference numeral 10'. Vehicle 10' is similar to vehicle 10, except that the drivetrain component also includes a transfer case 110. A second gear selector system 20' is employed to control operation of the transfer case 110. Gear selector system 20' is identical in its construction and operation to that of gear selector system 20, with the exception that its lock-out mechanism 38' is controlled by different control logic, and operates generally independently of the lock-out mechanism 38 of gear selector system 20.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A gear selector system for a vehicle drivetrain component comprising:
   a selector lever that is movable by an operator in a linear direction parallel to a lengthwise axis of the vehicle;
   a guide shaft connected to the selector lever and slidably supported on the vehicle; and
   a coupler connected to the guide shaft and a control linkage coupled to the vehicle drivetrain component, the coupler arranged to move the control linkage in proportion and direction to movement of the guide shaft in response to movement of the selector lever, thereby controlling operation of the drivetrain component.

2. The system of claim 1 wherein the drivetrain component comprises a vehicle transmission unit.

3. The system of claim 1 wherein the drivetrain component comprises a transfer case unit.

4. The system of claim 1 further comprising a stationary mechanism having a spring biased roller extending therefrom, wherein the coupler includes a plurality of detents formed therein, said spring biased roller positioned to selectively engage a detent as a function of the amount of linear movement of the guide shaft.

5. The system of claim 1 further comprising a locking mechanism responsive to a controller for selectively inhibiting movement of the guide shaft.

6. The system of claim 5 wherein the locking mechanism comprises a solenoid driven pin arranged to engage the coupler and prevent movement thereof.

7. The system of claim 5 wherein the controller is responsive to a control switch actuated by the operator in conjunction with movement of the selector lever.

8. The system of claim 5 wherein the controller is responsive to a control signal generated in response to actuation of a vehicle brake pedal.

9. A gear selector system for a vehicle drivetrain component comprising:

first and second selector levers arranged to be movable by an operator in a linear direction parallel to each other and a lengthwise axis of the vehicle;

a guide shaft connected to each selector lever and slidably supported on the vehicle; and a coupler connected to each guide shaft, one of the couplers connected to a control linkage coupled to a transmission unit, and the other coupler connected to a control linkage coupled to a transfer case unit, each coupler arranged to move the respective control linkage in proportion and direction to movement of the respective guide shaft in response to movement of the selector lever connected thereto.

10. The system of claim 9 wherein each coupler includes a plurality of detents formed therein, and the system further comprises a stationary mechanism associated with each guide shaft having a spring biased roller extending therefrom, each spring biased roller positioned to selectively engage a detent of the coupler connected to the associated guide shaft as a function of the amount of linear movement of the associated guide shaft.

11. The system of claim 9 further comprising a locking mechanism associated with each guide shaft and responsive to a controller for selectively inhibiting movement of the associated guide shaft.

12. The system of claim 11 wherein each locking mechanism comprises a solenoid driven pin arranged to engage the coupler connected to the associated guide shaft and prevent movement thereof.

13. The system of claim 11 wherein the controller is responsive to a control switch actuated by the operator in conjunction with movement of a selector lever.

* * * * *